G. K. CAVINESS.
GARDEN TOOL.
APPLICATION FILED DEC. 31, 1917.
1,292,704.
Patented Jan. 28, 1919.
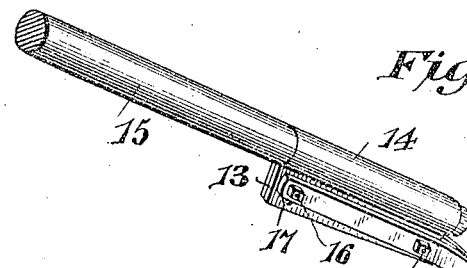
Fig. 1.
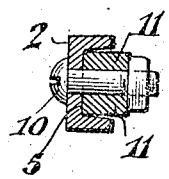
Fig. 4.
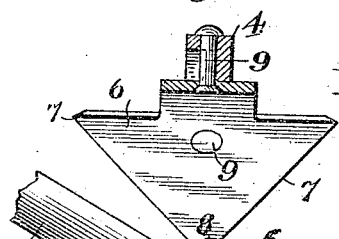
Fig. 5.
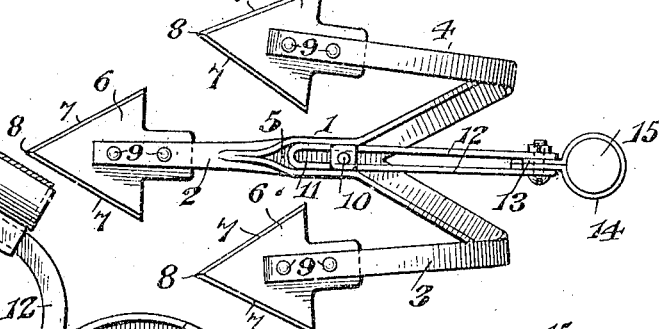
Fig. 2.
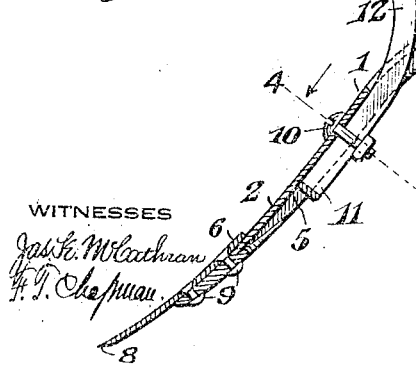
Fig. 3.
Fig. 6.
INVENTOR
George K. Caviness,
WITNESSES
ATTORNEY

UNITED STATES PATENT OFFICE.

GEORGE K. CAVINESS, OF SEYMOUR, IOWA.

GARDEN-TOOL.

1,292,704.   Specification of Letters Patent.   Patented Jan. 28, 1919.

Application filed December 31, 1917. Serial No. 209,689.

*To all whom it may concern:*

Be it known that I, GEORGE K. CAVINESS, a citizen of the United States, residing at Seymour, in the county of Wayne and State of Iowa, have invented a new and useful Garden-Tool, of which the following is a specification.

This invention relates to garden tools, and its object is to provide a tool of cultivator type which may be used as a hand tool or as an attachment to a garden plow.

The invention comprises a tool having three shanks formed in one piece to each receive a shovel, while the junction of the shanks is shaped to provide a socket or receptacle for a handle shank or for attachment to the garden plow.

The shanks and shovels carried thereby are so disposed that the forward shovel is the intermediate shovel, the shovels being disposed in the form of a triangle, with the apex forward and the base at the rear. Such a plow of wedge shape is easy to operate in all kinds of soil, as experience has shown.

The invention will be best understood from a consideration of the following detailed description, taken in connection with the accompanying drawing forming part of this specification, with the further understanding that, while the drawing shows a practical form of the invention, the latter is not confined to any strict conformity with the showing of the drawings but may be changed and modified so long as such changes and modifications come within the scope of the appended claims.

In the drawings:

Figure 1 is a perspective view of the tool;

Fig. 2 is an inverted view looking lengthwise of the handle;

Fig. 3 is a longitudinal central vertical section of the tool of Fig. 1;

Fig. 4 is a section on the line 4—4 of Fig. 3, omitting distant parts;

Fig. 5 is a section on the line 5—5 of Fig. 1;

Fig. 6 is a section on the line 6—6 of Fig. 3.

Referring to the drawings, there is shown a one-piece shank 1 having three legs 2, 3 and 4 respectively, the legs 3 and 4 being returned upon themselves in spaced relation to the leg 2. The leg 2 is made for a portion of its length of channel-shape as shown at 5, while the legs 3 and 4 are of L-shape in cross section. Such construction renders the leg 2 relatively stiff and rigid, while the legs 3 and 4 are considerably longer than the leg 2 and of smaller cross section, and consequently relatively flexible, but still sufficiently stiff for the purpose on account of their angle cross section.

At the free ends of each leg 2, 3 and 4, there is a blade 6 in the form of a plow shovel of general triangular shape, which may have sharpened approaching edges 7 terminating in a point 8 constituting a digging or soil-entering point. The blades or shovels 6 are made fast to the respective legs 2, 3 and 4 by rivets 9 or in any other appropriate manner.

The plows 6 all point in the same general direction, with the shank 1 slanting rearwardly. The leg 2 of the shank 1 is forward in the direction of travel of the tool when in operation, and the legs 3 and 4 with their plows 6, are to the rear of the leg 2 and its plow 6, and arranged on opposite sides of the forward line of travel of the plow 6 carried by the leg 2.

The shank 1 at the channel portion 5, which constitutes a pocket or receptacle, has a perforation for the passage of a bolt 10 designed to traverse a loop 11 of a width to seat in the receptacle formed by the channel 5. The loop 11 constitutes one end of a curved member 12 forming a handle shank produced by bending a suitable strip of metal upon itself. The sides of the handle shank 12 embrace webs 13 projecting from a handle-receiving ferrule 14, the webs 13 being brought together where the ferrule is applied to an elongated handle 15, and these webs are traversed by bolts 16 passing through suitable perforations in the handle shank 12. The webs 13 extend lengthwise of the ferrule 14, and are shown as tapering from one end toward the other. The wider ends of the webs 13 are distant from the plow structure, and there each has an extra perforation 17 so that the angle of the ferrule to the length of the handle shank 12 where it is attached to it may be adjusted about that bolt 16 distant from the perforation 17. This permits a variation in the angular relation of the handle 15 to the tool structure to accommodate it to different conditions.

When the plow structure is attached to a wheeled garden tool, the handle shank 12 is replaced by another attaching member suitably shaped to hold the plow points at the desired angle, but may be constructed with a loop 11 so as to permit the attachment of the plow arrangement to the body of the wheeled cultivator or garden tool in substantially the same way as the handle 15 is attached thereto. The handle 15 is readily attached or removed, and may be replaced by another handle in case of breakage, with only the necessity of loosening the bolts 16.

The handle shank 12 may be attached or removed by a suitable manipulation of the single bolt 10, and when attached, is fixedly held by such single bolt, due to the setting of the loop 11 in the channel 5.

The structure is such that the entire shank 1 may be formed of channel steel split lengthwise for the greater portion of its length to provide the two legs 3 and 4 of relatively light and flexible construction, and yet rendered strong by the angle cross section, each leg 3 and 4 being of about one-half the width of the leg 2, where traversed by the bolt 10.

By having the intermediate plow forward of the other two plows, the soil is very easily broken by the single plow, to be followed by the other plows on opposite sides of the path of the single plow and working easily because of the lessened resistance due to the preliminary breaking of the soil in advance of them.

What is claimed is:—

1. A garden or other tool provided with three plow points or shovels, a one-piece shank having three legs diverging therefrom with one leg in advance of and intermediately positioned with respect to the other two legs, with each leg carrying a respective one of the plow points or shovels, and a handle shank separate from and connected to the first named shank where the legs diverge therefrom.

2. A garden or other tool provided with a shank having three legs diverging therefrom with one of the legs in advance of and intermediately positioned with respect to the other two legs and shorter and heavier than said other two legs, each leg carrying a soil-engaging member.

3. A garden or other tool comprising a one-piece shank of web and flange material, formed into three legs, with one leg constituting the forward leg and shorter and heavier than the other legs, and said other legs diverging from the first leg and returned upon themselves into substantial parallelism with the first leg, and soil-engaging devices on said legs.

4. A garden or other tool comprising a one-piece shank formed at one end into diverging legs returned upon themselves and at the other end into another leg substantially in line with the shank, and soil-engaging members at the free ends of the legs.

5. A garden or other tool comprising a shank having at one end a leg in line with the shank and at the other end of channel form with diverging legs extending therefrom, and soil-engaging devices on the several legs arranged in triangular relation, with the soil-engaging member at the apex of the triangle in advance of those at the base of the triangle.

6. A garden or other tool comprising a structure consisting of a shank having a leg extending forwardly from one end thereof and divergent legs extending rearwardly from the other end thereof and returned forwardly upon themselves and all the legs carrying soil-engaging devices presented in the same direction and in triangular relation to each other, with the soil-engaging device at the apex of the triangle in advance of those at the base of the triangle, and means for attaching a carrying device to the shank at a point between the legs.

7. A garden or other tool comprising a shank having tool-carrying legs radiating from a common point, with one leg intermediate of the others and extending forwardly with respect to the direction of travel of the garden tool and in part formed of channel material, and the other legs diverging and extending first rearwardly and then downwardly into substantial parallelism with the first-named leg, and formed of angle material.

8. A garden tool comprising a shank with a forwardly extending and two rearwardly extending diverging legs, the second-named legs being returned upon themselves in a forward direction into substantial parallelism with the forward leg, and all the legs carrying soil-engaging devices, a handle-receiving ferrule, and a handle shank carrying the ferrule and having a loop at the end remote from the ferrule, the first-named shank where the legs are brought together being formed with a receptacle for the loop portion of the second-named shank, and a bolt connecting the two shanks together.

In testimony, that I claim the foregoing as my own, I have hereto affixed my signature in the presence of two witnesses.

GEORGE K. CAVINESS.

Witnesses:
 JOHN L. BROOKS,
 WILLIAM O. JAMISON.

Copies of this patent may be obtained for five cents each, by addressing the "Commissioner of Patents, Washington, D. C."